US 8,132,722 B2

(12) United States Patent
Buer

(10) Patent No.: US 8,132,722 B2
(45) Date of Patent: *Mar. 13, 2012

(54) SYSTEM AND METHOD FOR BINDING A SMARTCARD AND A SMARTCARD READER

(75) Inventor: Mark Buer, Gilbert, AZ (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/853,113

(22) Filed: Aug. 9, 2010

(65) Prior Publication Data

US 2010/0325438 A1 Dec. 23, 2010

Related U.S. Application Data

(63) Continuation of application No. 11/648,648, filed on Jan. 3, 2007, now Pat. No. 7,775,427.

(60) Provisional application No. 60/755,420, filed on Dec. 31, 2005.

(51) Int. Cl.
*G06K 5/00* (2006.01)
(52) U.S. Cl. .......................... 235/380; 713/161
(58) Field of Classification Search .............. 713/161, 713/184, 169, 155
See application file for complete search history.

(56) References Cited

U.S. PATENT DOCUMENTS

| 7,380,125 | B2 | 5/2008 | Di Luoffo et al. | |
|---|---|---|---|---|
| 7,775,427 | B2 | 8/2010 | Buer | |
| 2003/0014646 | A1 | 1/2003 | Buddhikot et al. | |
| 2003/0177353 | A1 | 9/2003 | Hiltgen | |
| 2003/0177392 | A1 | 9/2003 | Hiltgen | |
| 2003/0182551 | A1 | 9/2003 | Frantz et al. | |
| 2004/0059925 | A1* | 3/2004 | Benhammou et al. | 713/189 |
| 2005/0147250 | A1* | 7/2005 | Tang | 380/259 |
| 2006/0064588 | A1 | 3/2006 | Tidwell et al. | |
| 2006/0136717 | A1 | 6/2006 | Buer et al. | |
| 2007/0028118 | A1* | 2/2007 | Brown et al. | 713/185 |
| 2008/0215887 | A1* | 9/2008 | Hart et al. | 713/172 |

\* cited by examiner

*Primary Examiner* — Thien M. Le
*Assistant Examiner* — Sonji Johnson
(74) *Attorney, Agent, or Firm* — Sterne, Kessler, Goldstein & Fox PLLC

(57) ABSTRACT

Systems and methods for binding a smartcard and a smartcard reader are provided. A smartcard is provision to store a first set of credentials for use in traditional transactions such as at a brick and mortar retail store and a second set of credentials for use when performing a transaction using a smartcard reader associated with a user such as an on-line transaction. The user smartcard reader registers with a smartcard issuer server by cryptographically authenticating a secure processor associated with the smartcard reader. As a result of the registration, the secure processor obtains a set of private keys associated with the second set of credentials. When a request for a authorizing a transaction via the user's smartcard reader is received, the smartcard reader cryptographically authenticates itself to the smartcard using a private key associated with a credential to be used to authorize the transaction.

20 Claims, 4 Drawing Sheets

SYSTEM AND METHOD FOR BINDING A SMARTCARD AND A SMARTCARD READER

CROSS-REFERENCE TO RELATED APPLICATIONS

This application is a continuation of U.S. patent application Ser. No. 11/648,648, filed Jan. 3, 2007, which claims the benefit of U.S. Provisional application No. 60/755,420, filed Dec. 31, 2005, each of which is herein incorporated by reference in its entirety.

FIELD OF THE INVENTION

This application relates generally to data communications and more specifically to information security.

BACKGROUND OF THE INVENTION

Certain types of on-line services and applications are targets for hackers and other malicious individuals attempting to gain access to sensitive user information. This is particularly true for on-line financial applications such as Internet banking, on-line payment sites, and on-line brokerages. Common techniques used by hackers include the installation of viruses, Trojan horses, or spyware on a user's computer, phishing schemes where a user is tricked into accessing a fake website having the look and feel of the legitimate site, and man-in-the-middle attacks involving the interception of communication from the user's computer and an external server or device.

Various forms of authentication are used to provide security for on-line transactions. The forms of authentication are generally categorized in three classes: something the user is (e.g., a biometric such as a fingerprint), something the user has (e.g., a security token), and something the user knows (e.g., password). Security is strengthened by using multiple forms of authentication (referred to as "multi-factor" authentication) to verify the identity of a user.

Often when a user opens an account with a financial institution, the financial institution issues a smartcard (or a similar type of memory card) to enable the user to perform financial transactions. During a typical transaction made using a smartcard, the smartcard and smartcard reader perform a validation of one another. For example, the smartcard may verify that the smartcard reader is authorized to read the credential from the smartcard. In addition, the smartcard reader may verify that the smartcard contains the credential that the smartcard reader is authorized to read. The verification may involve the use of a public-private key pair where the public key is stored on the smartcard and the smartcard reader has access to the corresponding private key. In this case, the smartcard may require a smartcard reader to provide that it has the corresponding private key before the smartcard will release its credential to the reader.

In a conventional retail environment, provisions may be made to protect private keys stored in each smartcard reader. A high level of physical and data security may be implemented for each reader. For example, each reader may be provided with a tamper resistant and/or tamper evident housing. Additionally, smartcard readers may be continuously or periodically monitored.

However, the costs of providing such security for readers issued to individual users (e.g., to be associated with a user's personal computer) are prohibitive. Therefore, these user smartcard readers do not provide effective protection for private keys. Furthermore, a malicious user may tamper with a user smartcard reader to access and illicitly read smartcards in the proximity of the smartcard reader and conduct unauthorized transactions using these smartcards. Thus, the use of smartcards has been limited to traditional transactions (e.g., purchases at a brick and mortar retail store).

What is therefore needed are systems and methods for enabling a smartcard issued for traditional uses to be used for other verification purposes.

What is further needed are systems and methods for securely binding a smartcard to a smartcard reader through the use of credentials assigned to the smartcard.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
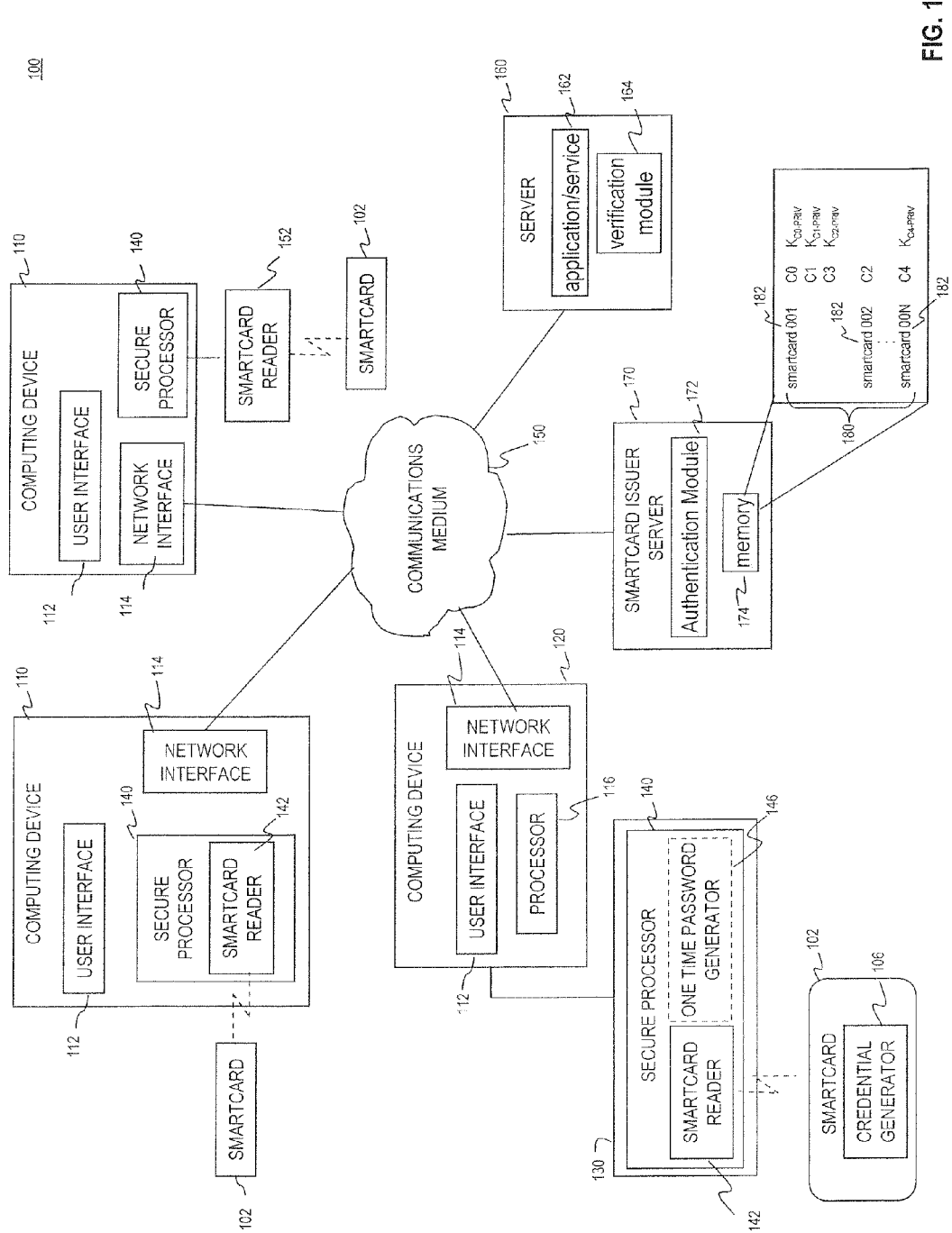
FIG. 1 is an exemplary operating environment for binding a smartcard and a smartcard reader, according to embodiments of the present invention.

The present invention will now be described with reference to the accompanying drawings. In the drawings, like reference numbers can indicate identical or functionally similar elements. Additionally, the left-most digit(s) of a reference number may identify the drawing in which the reference number first appears.

DETAILED DESCRIPTION OF THE INVENTION

FIG. 1 is an exemplary operating environment 100 for binding a smartcard and a smartcard reader, according to embodiments of the present invention. Exemplary operating environment 100 includes a plurality of smartcards 102, computing devices 110 having integrated secure processor 140, a plurality of computing devices 120, a plurality of external secure processing devices 130, a communications network 150, one or more external smartcard readers 152, a plurality of resource provider servers 160, and one or more smartcard issuer servers 170.

Smartcard 102 is a portable module which is issued by a provider of a service, resource, and/or application (referred to herein as a "resource" for ease of description). Smartcard 102 may be configured to provide payment services for a user (e.g., credit or debit cards). In addition, or alternatively, smartcard 102 may be used to provide authentication data for access to resources. Smartcard 102 includes a memory and a credential generator 106.

The memory is configured to store one or more credentials. In addition, for a set of credentials, the memory stores a public cryptographic key for each credential in the set. A smartcard issuer may program a smartcard with a plurality of credentials and associated data for use in a variety of contexts. A credential may be fixed information stored in smartcard 102 or may be data generated by smartcard 102. A smartcard issuer may provide one or more credentials for use in traditional settings (e.g., with a reader located in a retail establishment). These credentials may also have an associated public/private key pair. The public key for the credential is stored in memory. The private key is maintained in the smartcard issuer server 170 and provided only to authorized readers.

For example, credential C0 may be associated with the magnetic stripe on the smartcard. Credential C0 is then used for transactions in which the magnetic stripe is engaged (e.g., purchasing goods or services at a retail store). In a further example, credential C1 may be associated with the contact-based interface of smartcard 102 and credential C2 may be associated with the contactless interface of smartcard 102. Thus, credential C1 may be used for traditional transactions in which a contact-based reader is utilized and credential C2 may be used for traditional transactions in which a contactless reader is utilized. These represent credentials that are traditionally issued by institutions for use by readers located in relatively secure environments.

A smartcard issuer may generate a public/private key pair for credentials associated with smartcard readers issued to users. As described above, the security of user smartcard readers is typically weak. Therefore, these credentials are cryptographically bound to the user's smartcard reader. For these types of credentials, the public key associated with the credential is stored in smartcard 102. The private key associated with the credential is stored securely in a server associated with the smartcard issuer. The private key may be downloaded in a secure fashion to a secure processor 140 associated with user's smartcard reader. Credential C3 is an example of a credential for use when a transaction is initiated using a user's smartcard reader. Smartcard 102 stores the public key associated with credential C3 in memory.

Smartcard 102 includes a credential generator 106. In an embodiment, credential generator 106 is configured to generate a monotonically increasing value for each transaction attempted by the user of the smartcard (also referred to herein as a "transaction code"). Because this transaction code changes with each transaction and is not likely the same for multiple smartcards at the same time, it can be used as a one-time password or alternatively used by secure processor 140 to create a one-time password.

Using a one-time password to authenticate a user has several advantages. For example, a relatively strong password may be generated. That is, the one-time password may be a complicated value, not a simple value as would be typically selected by a user. In addition, the value of the password is constantly changing. Therefore, a relatively high level security may be provided without the complexities that may be involved in, for example, using a public key infrastructure to authenticate the user.

For example, accessing a service or device may involve accessing an on-line account or webpage that does not involve making a payment. For example, the user may have an account at an entity that provides the on-line service (e.g., on-line retailer from which user purchases goods). The user may maintain his or her smartcard information with the on-line entity. In this case, the on-line entity may have a record of the user's smartcard and also has the capability to verify a transaction made with that smartcard. Accordingly, the on-line entity may authenticate the user using one or more of the techniques described herein. For example, the user may inform the on-line entity that the smartcard is to be used as an authentication mechanism for certain services and applications. This may be accomplished, for example, by setting an appropriate indication in the user's record (e.g., registering the card as an authentication mechanism in the user's preferences).

Computing device 110 includes a user interface 112, a network interface 114, and an integrated secure processor 140. Computing device 120 includes a user interface 112, a network interface 114, and a processor 116. Unlike computing device 110, computing device 120 does not have an integrated secure processor 140. Both computing device 110 and computing device 120 may include an interface for coupling with an external secure processing device 130 (not shown). Computing device 110 or 120 is any device with a processor including, but not limited to, a personal computer, a laptop, a wireless phone, a personal digital assistant (PDA), or a personal entertainment device.

User interface 112 is configured to enable a user to interact with computing device 110 or 120 and to request access to remote applications and services. User interface 112 may include one or more output devices including, but not limited to, a display, indication lights, and a speaker. In addition, user interface 112 may include one or more input devices including, but not limited to, a keypad, button, pointing device, touch screen, audio device, soft-key-based menu. For example, authentication data such as a log-in/password pair may be entered via user interface 112.

Network interface 114 is configured to enable computing device 110 or 120 to communicate with network 150. In an embodiment, network interface 114 is a wired interface. In an additional or alternative embodiment, network interface 114 is a wireless interface.

Secure processing device 130 is a stand-alone device which may be coupled to computing device 110 or 120 to provide secure processing capabilities. Secure processing device 130 may be a dongle (e.g., a USB-based dongle) or any other device which can be coupled to a computing device. Secure processing device 130 includes a secure processor 140.

Secure processor 140 provides the required cryptographic operations to encrypt, decrypt, and/or authenticate data that is sent or received by the secure processor. Additionally, secure processor 140 is configured to securely communicate with one or more smartcard issuer servers 170 to securely access private key information. In an embodiment, secure processor 140 includes a one-time password generation module 146. One-time password generation module 146 is configured to generate a one-time password based on a transaction code received from a smartcard. Secure processor 140 may comprise a processor, memory, dedicated cryptographic hardware, and an optional smartcard reader 142. In addition, secure processor 140 may incorporate other security mechanisms. In an embodiment, secure processor 140 is designed to conform to a security specification relating to, for example, FIPS or TPM. Secure processor 140 may also communicate with a database, service, etc. that provides access to a service.

A security boundary associated with secure processor 140 may be established, for example, using hardware and/or cryptographic techniques. Hardware techniques for providing a security boundary may include, for example, placing components within a single integrated circuit. In addition, one or more integrated circuits may be protected by a physical structure using tamper evident and/or tamper resistant techniques such as epoxy encapsulation. Encryption techniques for establishing a security boundary may include, for example, encrypting sensitive information before it leaves secure processor 140. For this purpose, secure processor 140 may use one or more cryptographic processors and store the associated encryption/decryption keys in a secure memory internal to secure processor 140.

Secure processor 140 stores one or more private keys associated with credentials for one or more smartcards 102 in a memory. Each private key record in memory may contain a smartcard identifier, a credential identifier, and the associated private key. This data may be stored either within the security boundary or external to the security boundary of secure processor 140. Alternatively, secure processor 140 may store the information in an external memory in an encrypted form. The key(s) used to encrypt, decrypt, and/or authenticate the externally stored information may be maintained with the security boundary of secure processor 140.

In an embodiment, secure processor 140 includes the capabilities to generate an asymmetric key pair (public/private key pair). In an alternative embodiment, the private key is "securely injected" into the secure processor 140. In the secure injection embodiment, the entity which injects the private key must "forget" the private key to ensure the integrity and privacy of the asymmetric key pair. In either embodiment, the private key does not leave the hardware security boundary of processor 140 unless encrypted. An exemplary system and process for securely generating an asymmetric key pair or securely injecting a private key into a processor is described in detail in U.S. Patent Publication No. 2005/0166051, entitled "System and Method for Certification of a Secure Platform," which is incorporated herein by reference in its entirety.

Smartcard reader 142 is configured to read credentials from smartcard 102. In an embodiment, smartcard reader 142 is only authorized to read a subset of credentials stored in smartcard 102. In some embodiments, smartcard reader 142 resides within the security boundary associated with secure processor 140. In these embodiments, information received from smartcard 102 may be securely maintained within secure processor 140. For example, a credential generated by smartcard 102 may be encrypted before it is communicated outside the chip within which secure processor 140 is implemented. In addition, the credential may be sent to server 160 via a secure connection. As a result, information from smartcard 102 remains secured, even if computing device 110 or 120 is compromised.

Smartcard reader 152 is external to computing device 110. Smartcard reader 152 communicates with secure processor 140 of computing device 110 via a data link. The data link may be a bus or some other form of wired or wireless connection. In an embodiment, this data link is a secure data link (e.g., a dedicated bus such as a dedicated USB connection). The secure processor 140 then provides private keys to smartcard reader 152 over the secure data link. In an embodiment, smartcard reader 152 stores private keys for the smartcard locally. Alternatively, smartcard reader 152 obtains keys from secure processor 140 as needed.

In an embodiment, smartcard reader 142 or 152 includes a contact-based interface. In a contact-based interface, the secure processor 140 has one or more electrical connectors which make contact with electrical connectors on smartcard 102. In addition or alternatively, smartcard reader 142 or 152 includes a contactless interface. For example, secure processor 140 or reader 152 may communicate with smartcard 102 using radio frequency identification (RFID) induction technology, low frequency RFID, or near field communication (NFC) such as high frequency RFID, IS) 14443 and ISO 15693.

As would be appreciated by persons of skill in the art, secure processor 140 and smartcard reader 142 may reside on the same integrated circuit.

In an embodiment, computing devices 110 or 120 (or secure processor 140) directly access resource provider server 160 and/or smartcard issuer server 170 via a communications medium 150. Communications medium 150 may be a public data communications network such as the Internet, a private data communications network, the Public Switched Telephone Network (PSTN), a wireless communications network, or any combination thereof. The interface between the computing devices 110, 120 and communications network 150 can be a wireless interface or a wired interface.

Resource provider server 160 hosts one or more resources, applications, and/or services 162 to which a user is enrolled. Resource provider server 160 may comprise hardware and/or software configured to provide a resource, service, or application. For example, a server may include a processing system that handles access requests, authenticates the requestor, and facilitates access to the requested resource, service, or application.

In an embodiment, resource provider server 160 includes a verification module 164. Verification module 164 is configured to validate that the credential received from a smartcard 102 (via secure processor 140) is the credential which is expected. Verification module 164 includes an algorithm corresponding to the algorithm used to generate the code. For example, the algorithm verifies that the value of the received credential matches the value that verification module 164 generates corresponding to smartcard 102 (e.g., within a window of values).

Smartcard issuer server 170 includes an authentication module 172 and memory 174. Authentication module 172 is configured to authenticate one or more secure processors 140 attempting to access private key information. Memory 174 is configured to store key information for one or more smartcards issued by a smartcard issuer. For example, memory 174 may include one or more smartcard records 180. A record 180 may in turn include a smartcard identifier 182 and a plurality of credential—private key pairs associated with the smartcard. For example, smartcard 001 includes three credential—private key pairs (C0-$K_{c0\text{-}priv}$, C1-$K_{c1\text{-}priv}$, C3-$K_{c2\text{-}priv}$).

As would be appreciated by persons of skill in the art, the functionalities of smartcard issuer server 170 and resource provider server 160 may be incorporated into the same device.

Figure 2:
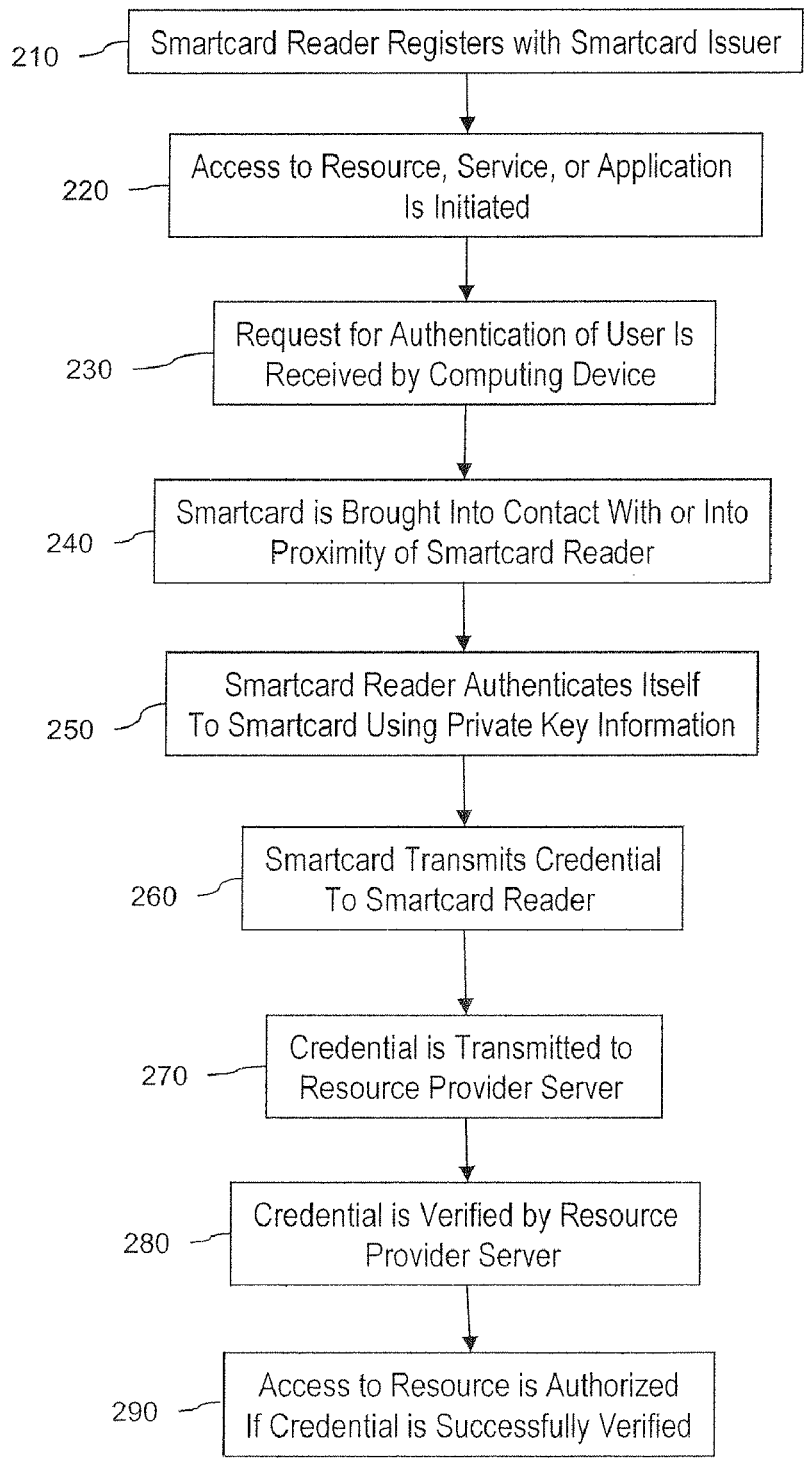
FIG. 2 depicts a flowchart of a method for binding a smartcard reader to a smartcard, according to embodiments of the present invention.

FIG. 2 depicts a flowchart 200 of a method for binding a smartcard reader to a smartcard, according to embodiments of the present invention. Flowchart 200 is described with continued reference to the exemplary operating environment depicted in FIG. 1. However, flowchart 200 is not limited to that embodiment. Note that some of the steps in flowchart 200 do not necessarily have to occur in the order shown.

Prior to step 210, a user enrolls with a provider of an application or service. In an illustrative example, the service provider is a financial institution such as a bank, brokerage, credit union, etc. The provider issues the user a smartcard having a plurality of credentials programmed into the memory of the smartcard. As described above, one or more of the credentials may have an associated private key. In addition to issuing the smartcard, the smartcard issuer stores the associated public keys for the credentials in the smartcard issuer server. Additionally, if the smartcard is configured to generate a changing value as a credential (e.g., a transaction code), the smartcard issuer may initialize the card with the appropriate information such as seed values and counter values required for the credential generation algorithm. The smartcard issuer also maintains a corresponding set of these values at the verification module 164 of provider server 160.

In step 210, reader 142 is registered with a smartcard issuer. During the registration process, private keys associated with one or more credentials for the smartcard are downloaded from smartcard issuer server 170. Step 210 is described in further detail in FIG. 3 below. Note that step 210 may be repeated if multiple smartcards are to be bound or a single smartcard has data associated with multiple smartcard issuers.

In step 220, a user initiates access to a resource, service, or application 162 provided by or on-behalf of the service provider. In an embodiment, the service or application allows the user to access his or her financial information or perform financial transactions over a public data network (e.g., Internet). A user may access service or application 162 via any suitable computing device. For example, a user may use a standard web browser to access a webpage through which a user can gain access to the desired application or service.

In step 230, a request for authentication of the user, including a request for a credential, is received by computing device 110 or 120. The request for authentication may also include a request for authentication data associated with a different authentication factor (e.g., log-in and password or shared secret).

By requiring a user to present a credential generated by the smartcard and additional authentication data associated with a different authentication factor, a person who gained access to the additional authentication data would not be able to access an application or service without the credential generated by the smartcard. Also, a person who gained access to the additional authentication data and a credential value (e.g., via a phishing scheme, spyware, or man-in-the-middle attack) would not be able to access the service at a later time because the credential value varies each transaction.

In step 240, smartcard 102 is brought into contact with or into proximity of smartcard reader 142 or 152.

In step 250, smartcard reader 142 or 152 authenticates itself to smartcard 102 using private key information associated with the requested credential. As described above, smartcard reader 142 securely stores private key memory within secure processor 140 or external to secure processor 140. Smartcard reader 152 may request a private key from secure processor 140 during step 250. Alternatively, smartcard reader 152 stores the private key associated with the credential locally. An exemplary method for authenticating the smartcard reader 142 or 152 to the smartcard 102 using a challenge/response protocol is described below in FIG. 4. At the completion of step 250, the smartcard is bound to the reader.

In step 260, smartcard 102 transmits the credential to the smartcard reader 142 or 152. In addition, prior to step 260, credential generator 106 may generate a new credential value (e.g., a newly generated version of the monotonically increasing transaction code) for transmission to the reader 142 or 152.

In step 270, the credential is transmitted to the resource provider server 160. In an embodiment, smartcard reader 142 passes the credential to computing device 110 or 120 (e.g., through middleware and/or software executing on the computing device). In some embodiments, the credential may be passed directly through secure processor 140. For example, secure processor 140 may securely send the credential to resource provider server 160. Secure processor 140 may establish a secure connection between secure processor 140 and resource provider server 160. Additionally, in step 270, the additional authentication data, if requested, is transmitted to resource provider server 160.

In an alternative embodiment, the credential from smartcard 102 is passed to secure processor 140 which in turn generates a one-time password using the smartcard credential as an input. In a further embodiment, secure processor 140 includes functionality to verify the credential received from smartcard 102. For example, secure processor 140 may be configured with the necessary seed information and algorithm(s) to generate the credential for comparison.

In step 280, verification module 164 of resource provider server 160 verifies the credential and if requested, the additional authentication data.

In step 290, access to the resource is authorized if the credential is successfully verified.

Figure 3:
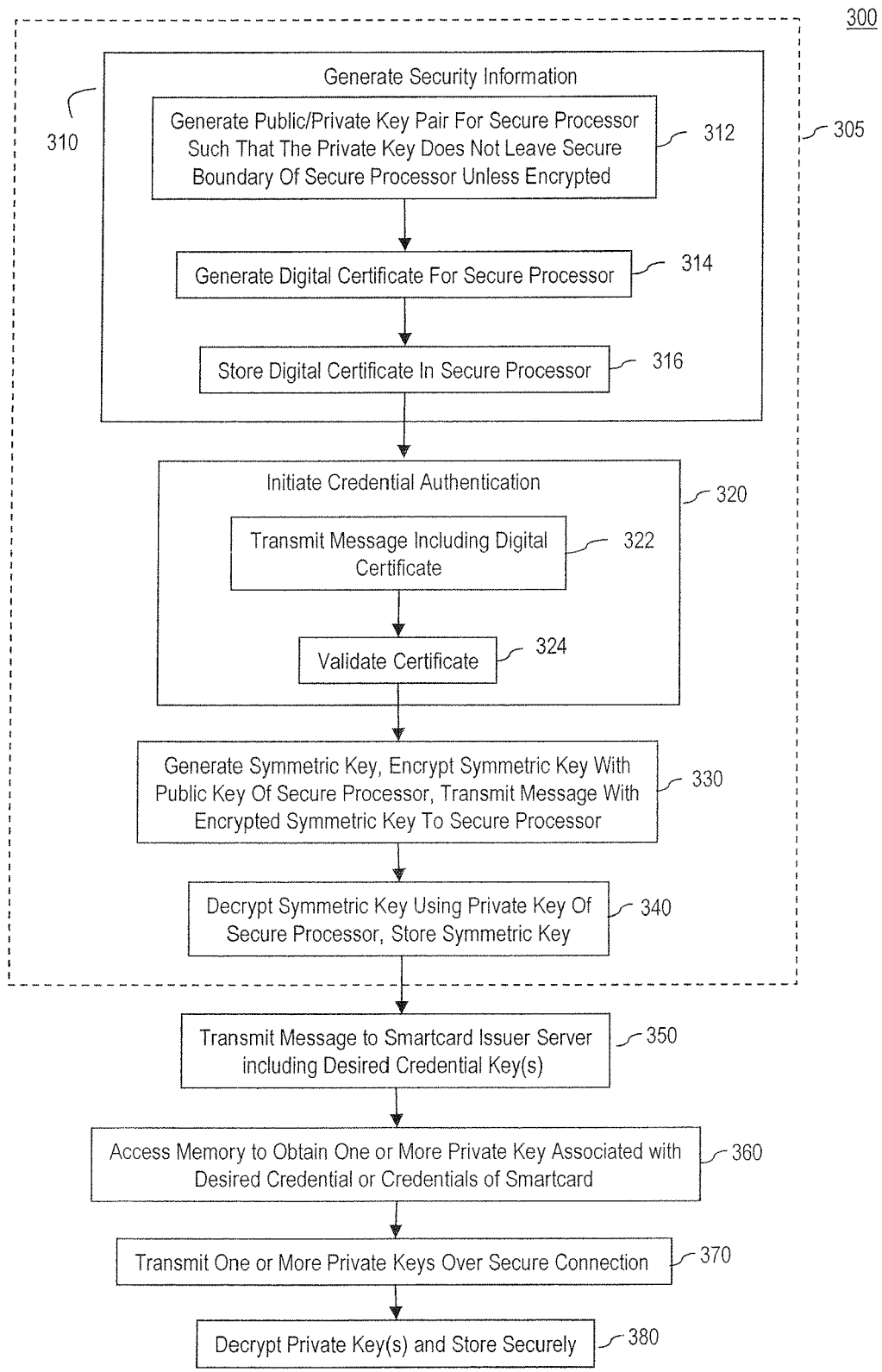
FIG. 3 depicts a flowchart of an illustrative method for retrieving a private key associated with a credential, according to embodiments of the present invention.

FIG. 3 depicts a flowchart 300 of an illustrative method for retrieving a private key associated with a credential, according to embodiments of the present invention. Flowchart 300 is described with continued reference to the illustrative system of FIG. 1. However, flowchart 300 is not limited to that embodiment. Note that some steps in flowchart 300 do not have to occur in the order shown.

In step 305, a secure communications connection is established between secure processor 140 and smartcard issuer 170. Step 305 includes steps 310-340. The creation of a secure connection allows for encryption of messages between secure processor 140 and smartcard issuer 170. That is, any private key transmitted is not transmitted in the clear.

In step 310, security information for secure processor 140 is generated. Step 310 includes steps 312-316. Step 310 generally occurs once per secure processor 140 prior to initial use of the secure platform.

In step 312, an asymmetric key pair (e.g., public/private key pair) is generated by secure processor 140 such that the private key does not leave the hardware security boundary of secure processor 140 unless encrypted. In an alternate embodiment, the private key is "securely injected" into secure processor 140. In the secure injection embodiment, the entity which injects the private key must "forget" the private key to ensure the integrity and privacy of the asymmetric key pair.

In step 314, a digital certificate is generated for secure platform 140. Step 314 may occur at the time of manufacture of the device. Alternatively, step 314 may occur when the secure platform is configured for use. As would be appreciated by a person of skill in the art, any procedure for generating a digital certificate can be used with the current invention. In an illustrative example, secure processor 140 initiates a key enrollment process with a certification authority. During the enrollment process, secure processor 140 communicates its public key and optionally identifying information. The certification authority then authenticates the identity of secure processor 140. The verification process can be performed in a variety of ways. For example, when the public/private key pair was generated by secure processor 140, secure processor 140 may share the public key, via a secure communication link, with a warranty server. The warranty server stores a listing of valid public keys for secure processors. In this example, the certification authority may query the warranty server to validate that the received public key is a valid public key for a secure processor. In addition or alternatively, the certification authority may validate the identification information provided by secure processor 140.

After the certification authority has authenticated the identity of secure processor 140, the certification authority issues a digital certificate for secure processor 140. The digital certificate binds the identity of the certificate owner (i.e., secure processor) to a public/private key pair. The digital certificate includes the public key of secure processor 140, a name or other identifier for secure processor, an expiration date, serial number, and identification of organization that issued the certificate. The certification authority signs the digital certificate using its private key. As would be recognized by persons of skill in the art, any technique for generating a signed certificate can be used with the present invention. Note that the public key of the certification authority must be publicly available to enable validation of the secure processor certificate.

In step 316, the digital certificate is stored in memory at secure processor 140.

In step 320, secure processor 140 initiates credential authentication with smartcard issuer server 170. Step 320 includes step 322 and step 324.

In step 322, secure processor 140 transmits a message including its digital certificate to smartcard issuer server 170. Note that the messages in the exchange of step 322 between smartcard issuer server 170 and secure processor 140 may include additional information to deter man-in-the-middle and replay attacks.

In step 324, authentication module 172 in smartcard issuer server 170 validates the received certificate. In step 324 (or prior to step 324), server 170 obtains the public key of the certification authority which issued the certificate to secure processor 140. Server 170 then uses the public key of the certification authority to verify the signature included with the digital certificate. If the certificate is authentic, operation proceeds to step 330. If the certificate is not authentic, flowchart 300 ends.

In step 330, server 170 generates a symmetric key for use in securing communications with secure processor 140. As would be appreciated by persons of skill in the art, any technique for generating a symmetric key can be used with the present invention. In addition, in step 330, server 170 encrypts the symmetric key with the public key of the secure processor which was received in the digital certificate. Server 170 then transmits a message including the encrypted symmetric key to secure processor 140. Note that server 170 may assign an expiration date/time for the symmetric key. When the symmetric key "expires," steps 320 and 330 are repeated to establish a new symmetric key for communication between server 170 and secure processor 140.

In an embodiment, in step 330, smartcard issuer server 170 generates a hash of the message (e.g., using HMAC, MAC, or CCMP) and signs the hash. The use of a digital signature provides a mechanism for secure processor 140 to verify that the message was received from a legitimate server 170. In addition, smartcard issuer server 170 may send its digital certificate to secure processor 140.

In step 340, secure processor 140 decrypts the message to obtain the symmetric key using its private key. The symmetric key is then stored in secure processor 140 for use in encrypting communication between secure processor 140 and server 170.

If the received message was signed by smartcard issuer server 170, secure processor 140 verifies the signature in step 340. In an embodiment, secure processor 140 has a copy of the public key for server 170 stored in memory. Alternatively, secure processor 140 retrieves the public key from a remote database. Secure processor 140 then uses that public key to verify the signature on the message. Alternatively, server 170 may transmit a digital certificate to secure processor 140. In this embodiment, secure processor 140 must retrieve the public key of the certificate authority which issued server's certificate. Secure processor 140 then validates the authenticity of the provided certificate using the public key of the certificate authority. Secure processor 140 can then use the public key provided in the certificate to verify the signature on the message. At the completion of step 340, a secure connection is established between secure processor 140 and smartcard issuer server 170.

Steps 310 through 340 describe one method for creating a secure connection between secure processor 140 and smartcard issuer server 170. As would be appreciated by persons of skill in the art, other methods for creating a secure connection could be used with the present invention.

In step 350, secure processor 140 transmits a message to smartcard issuer server 170 including the desired credential or credentials and optionally the reader's unit identifier.

In step 360, smartcard issuer server 170 accesses memory 174 to obtain one or more private key associated with the desired credential or credentials of the smartcard 102. Additionally, smartcard issuer server 170 may use the reader unit identifier to determine whether the requesting reader is authorized to have access to the requested credential(s). In this way, only authorized readers are provided with the private key to read a given credential.

In step 370, the one or more private keys associated with smartcard 102 are transmitted over the secure connection to secure processor 140. In an embodiment, the key(s) are encrypted using the public key of secure processor 140 prior to transmission.

In step 380, the one or more private keys are decrypted and stored securely by secure processor 140. Alternatively, if reader is external to secure processor 140, the private key(s) are transmitted to reader 152 over a data connection.

Upon completion of flowchart 300, smartcard reader 142 or 152 (via secure processor 140) is configured to read one or more credentials from smartcard 102. The reader and/or secure processor can then be used to perform various transactions using the credential. As described above, a smartcard issued for traditional users (e.g., retail usage using a first set of credentials) can be used for other verification purposes (e.g., providing a secure credential for an on-line transaction). This may be accomplished without compromising the first set of credentials because the user's reader cannot access the first set of credentials.

Figure 4:
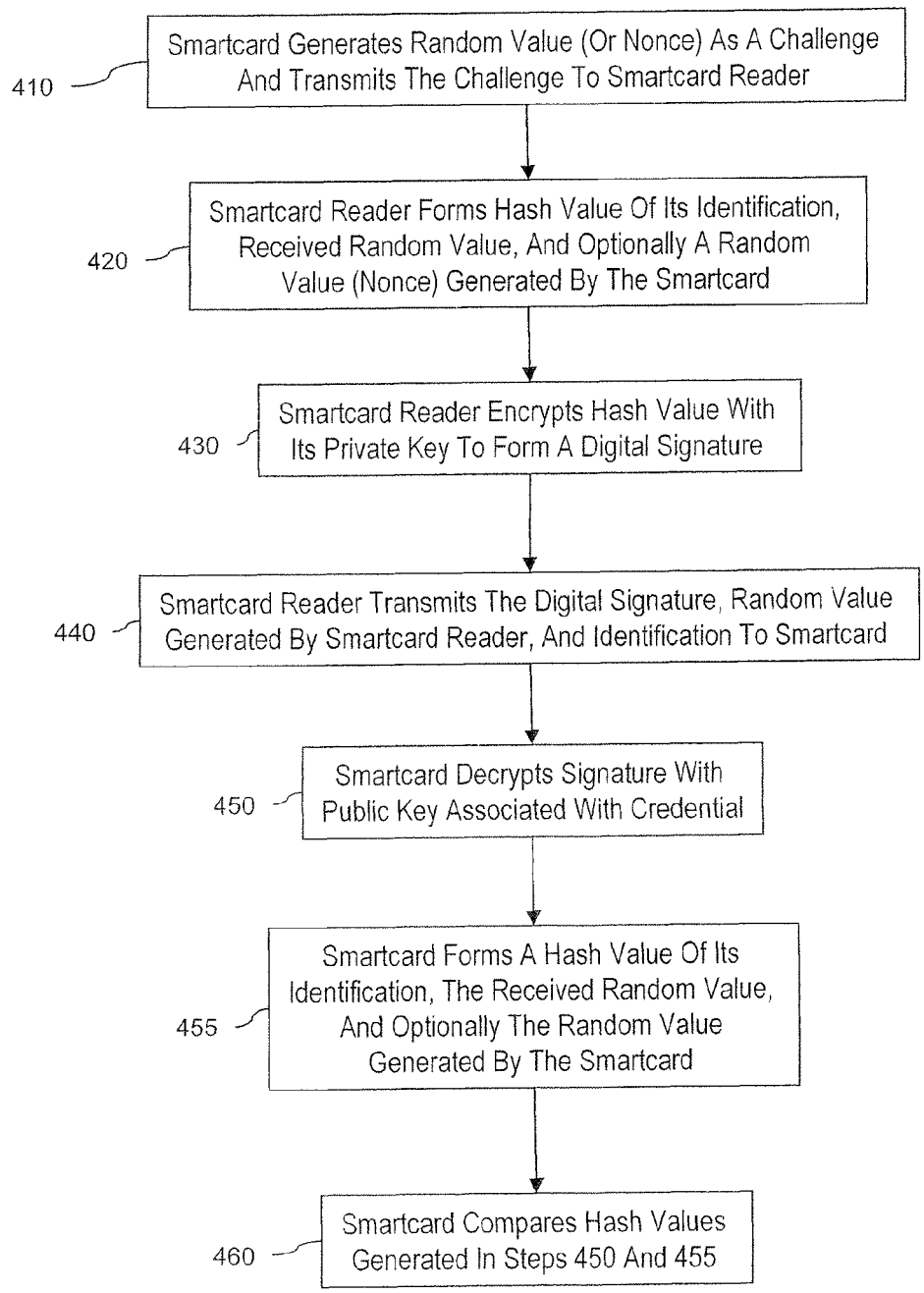
FIG. 4 depicts a flowchart of an exemplary challenge/response protocol, according to embodiments of the present invention.

FIG. 4 depicts a flowchart 400 of an exemplary challenge/response protocol, according to embodiments of the present invention. Flowchart 400 is described with continued reference to the exemplary operating environment depicted in FIG. 1. However, flowchart 400 is not limited to these embodiments. Note that some of the steps in flowchart 400 do not necessarily have to occur in the order shown.

In step 410, smartcard 102 generates a random value (or nonce) as a challenge and transmits the challenge to smartcard reader 142 or 152.

In step 420, smartcard reader 142 or 152 forms a hash value of its identification, the received random value, and optionally a random value (or nonce) generated by smartcard 102.

In step 430, smartcard reader 142 or 152 encrypts the hash value with the private key associated with the credential to form a digital signature.

In step 440, smartcard reader 142 or 152 transmits the digital signature, random value generated by smartcard reader 142 or 152, and identification to smartcard 102.

In step 450, smartcard 102 decrypts the signature with the public key associated with the credential.

In step 455, smartcard 102 forms a hash value of its identification, the generated random value, and optionally the token nonce. Steps 450 and 455 may occur substantially in parallel.

In step 460, smartcard 102 compares the hash values generated in steps 450 and 455. If the two values match, smartcard reader 142 or 152 is successfully authenticated.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for using a smartcard issuer server to bind a smartcard having a plurality of credentials to a smartcard reader associated with a secure processor, comprising:
  (a) registering the smartcard reader with the smartcard issuer server, wherein registration includes cryptographically authenticating the secure processor to the smartcard issuer server;
  (b) receiving, at the smartcard issuer server, a message from the secure processor, wherein the message includes a request for a set of private keys associated with a set of credentials stored on the smartcard, one private key per credential;
  (c) retrieving the set of private keys associated with the set of credentials; and
  (d) transmitting, from the smartcard issuer server, the set of private keys to the secure processor, wherein a private key associated with a credential in the set of credentials cryptographically authenticates the smartcard reader to the smartcard.

2. The method of claim 1, wherein step (a) further comprises:
  (i) establishing a secure connection between the smartcard issuer server and the secure processor.

3. The method of claim 2, wherein step (a)(i) comprises:
  (a) receiving a message from the secure processor including a digital certificate for the secure processor;
  (b) obtaining a public key of a certification authority which issued a digital certificate to the secure processor;
  (c) verifying a signature included in the digital certificate using the public key;
  (d) generating a symmetric key wherein the symmetric key is used to encrypt communication between the secure processor and the smartcard issuer server, if the verification is successful;
  (e) encrypting the symmetric key with the public key of the secure processor; and
  (f) transmitting a message to the secure processor wherein the message includes the encrypted symmetric key.

4. The method of claim 1, wherein the message of step (b) further includes a smartcard reader identifier; and
  the method farther comprises prior to step (c) determining if the smartcard reader is authorized to have access to the requested set of private keys.

5. The method of claim 1, further comprising of encrypting the private keys with a public key of a secure processor prior to step (d).

6. A smartcard issuer server for use in binding a smartcard reader to a smartcard comprising:
  (a) a receiver for receiving a registration message from a smartcard reader;
  (b) a memory configured to store a plurality of smartcard records wherein a smartcard record includes a smartcard identifier and a plurality of credential-private key pairs associated with the smartcard;
  (c) a processor configured to access the memory for a set of private keys associated with a set of credentials stored on the smartcard; and
  (d) a transmitter configured to transmit the set of private keys to a secure processor, wherein a private key associated with a credential in the set of credentials cryptographically authenticates the smartcard reader to the smartcard.

7. The smartcard issuer server of claim 6, further comprising a cryptographic authenticator module configured to cryptographically authenticate the secure processor to the smartcard issuer server in order to establish a secure connection between the smartcard issuer server and the secure processor.

8. The smartcard issuer server of claim 7, wherein the cryptographic authenticator module is configured to:
  (a) receive a message from the secure processor, wherein the message includes a digital certificate for the secure processor;
  (b) obtain a public key from a certification authority that issued the digital certificate to the secure processor and verify the signature included in the digital certificate using the public key;
  (c) generate a symmetric key for encrypting communication between the secure processor and the smartcard issuer server; and
  (d) transmit a message to the secure processor that includes the symmetric key, if the verification is successful.

9. The smartcard issuer server of claim 8, wherein the cryptographic authenticator module is configured to assign an expiration date/time to the symmetric key.

10. The smartcard issuer of claim 7, wherein the smartcard issuer server is configured to encrypt the private keys with a public key of the secure processor.

11. The smartcard issuer of claim 6, wherein the receiver is further configured to receive a request message from the secure processor wherein the request message includes the set of credentials stored on the smartcard.

12. The smartcard issuer of claim 6, wherein the request message includes a smartcard reader identifier and wherein the processor is configured to determine if the smartcard reader is authorized to have access to the requested set of private keys based on the smartcard reader identifier.

13. A secure processor for binding a smartcard reader to a smartcard, the secure processor comprising:
  a registration module configured to register the smartcard reader with a smartcard issuer server to obtain a first set of private keys associated with a set of credentials stored on the smartcard, one private key per credential, wherein the registration module includes a cryptographic authenticator module configured to:
    cryptographically authenticate the smartcard reader to the smartcard using a private key associated with a credential in the set of credentials.

14. The secure processor of claim 13, further comprising:
  a memory for storing the first set of private keys associated with the set of credentials stored on the smartcard.

15. The secure processor of claim 14, wherein the memory is within a security boundary established by the secure processor.

16. The secure processor of claim 13, wherein the smartcard reader is within a security boundary established by the secure processor.

17. The secure processor of claim 13, wherein the smartcard reader is coupled to the secure processor via a secure data connection.

18. The secure processor of claim 13, wherein the cryptographic authenticator module is configured to establish a secure connection between the secure processor and the smartcard issuer server.

19. The secure processor of claim 13, wherein the secure processor is configured to receive a credential from the smartcard if authentication of the smartcard reader to the smartcard was successful.

20. The secure processor of claim 19, further comprising:
  a one-time password generator configured to generate a one-time password using the credential as an input.

* * * * *